United States Patent [19]
Handrich et al.

[11] Patent Number: 4,702,600
[45] Date of Patent: Oct. 27, 1987

[54] METHOD AND APPARATUS FOR MEASURING ANGULAR RATE WITH A PASSIVE OPTICAL RESONATOR

[75] Inventors: Eberhard Handrich, Kirchzarten; Werner Schröder, Umkirch, both of Fed. Rep. of Germany

[73] Assignee: Litef GmbH, Freiburg im Breisgau, Fed. Rep. of Germany

[21] Appl. No.: 757,276

[22] Filed: Jul. 19, 1985

[30] Foreign Application Priority Data

Jul. 20, 1984 [DE] Fed. Rep. of Germany ....... 3426868

[51] Int. Cl.$^4$ .......................... G01C 19/64; G01B 9/02
[52] U.S. Cl. .................................................. 356/350
[58] Field of Search ......................................... 356/350

[56] References Cited
U.S. PATENT DOCUMENTS 4,514,088  4/1985  Coccoli .............................. 356/350
4,569,593  2/1986  Auch et al. ......................... 356/350
4,573,795  3/1986  Auch et al. ......................... 356/350

Primary Examiner—Vincent P. McGraw
Assistant Examiner—S. A. Turner
Attorney, Agent, or Firm—Elliott N. Kramsky

[57] ABSTRACT

A method and apparatus for reading out angular rates by means of a passive optical resonator provides for the generation of three component light beams individually tuned to distinct resonator modes. One component light beam is radiated into the resonator in the opposite direction to the two other component light beams. By means of an evaluating logic, differences are formed between the counterrotating light beams and the differences weighted and subtracted from each other to provide angular rate. The optical length of the resonator, and, thus, temperature are available as a weighted sum of the differences. Temperature drift may be eliminated from angular rate measurements by compensation according to the invention.

19 Claims, 4 Drawing Figures

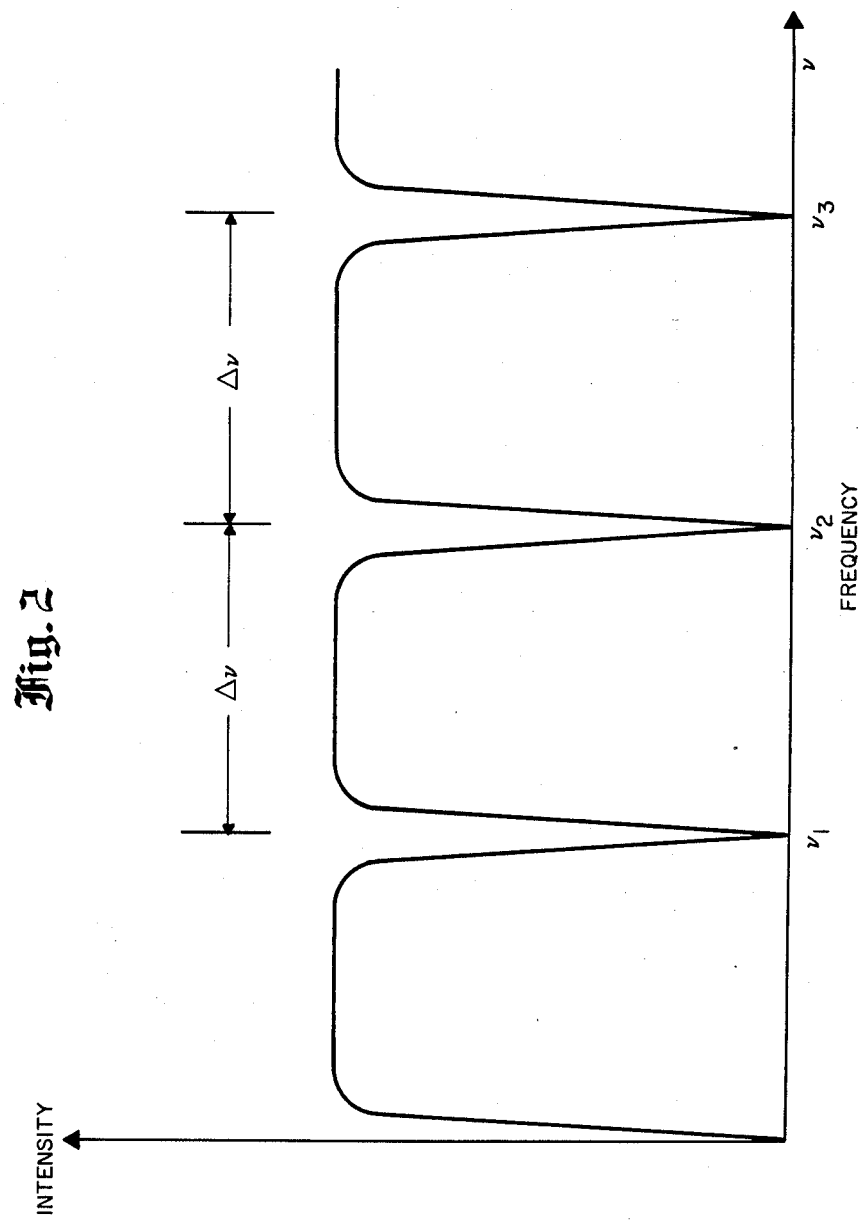

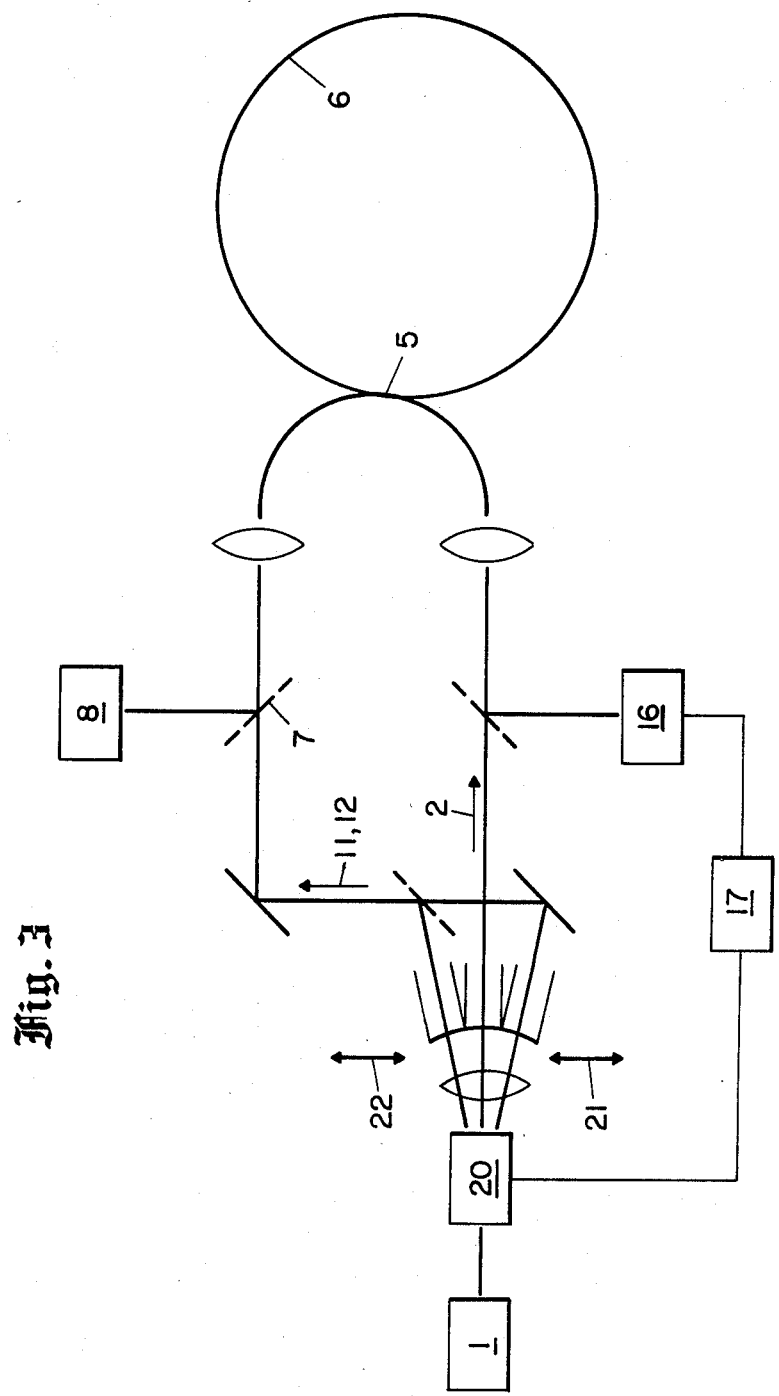

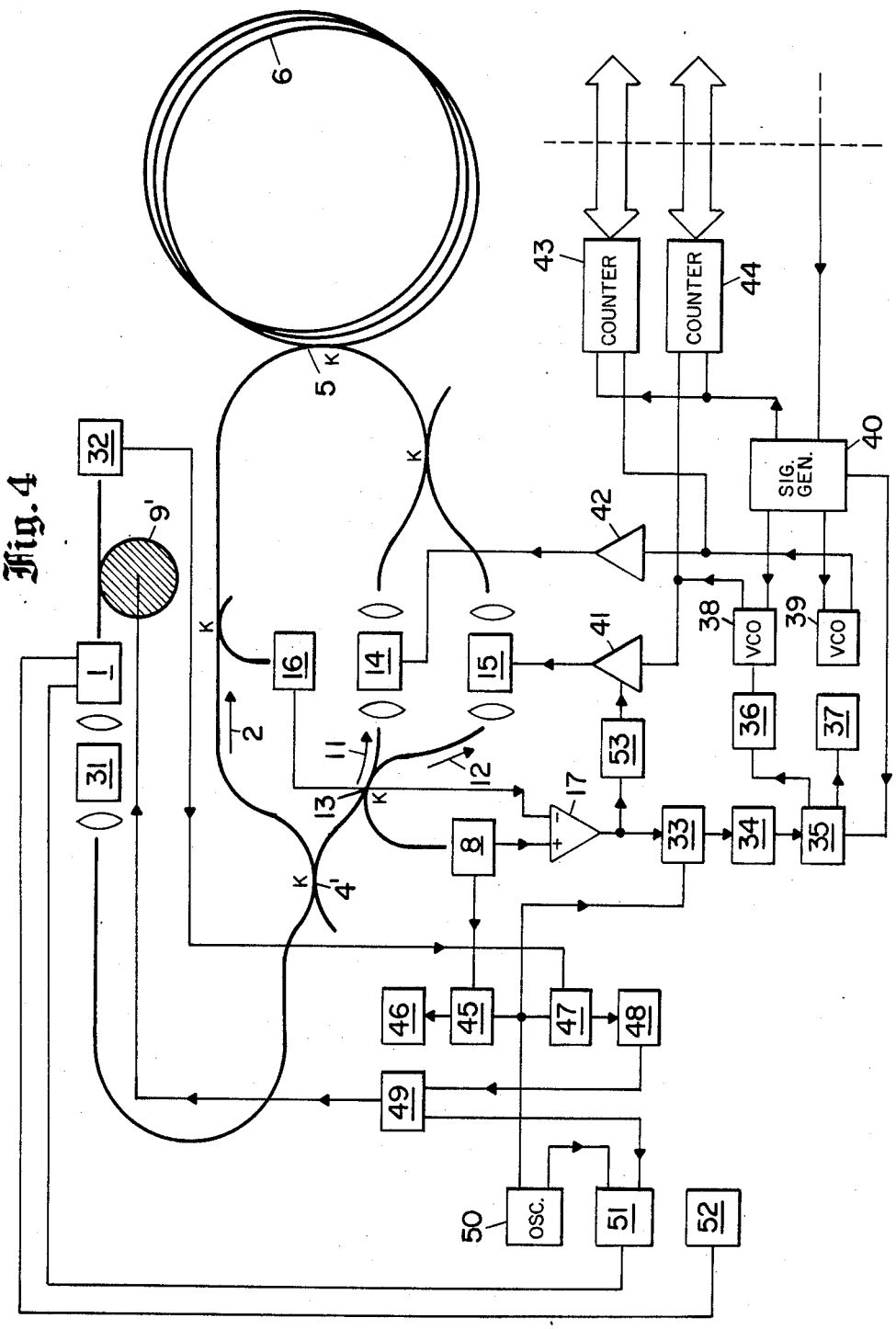

METHOD AND APPARATUS FOR MEASURING ANGULAR RATE WITH A PASSIVE OPTICAL RESONATOR

BACKGROUND

1. Field of the Invention

The present invention relates to methods and apparatus for measuring angular rates. More particularly, this invention pertains to a method and apparatus for measuring rotation, in accordance with the Sagnac effect, utilizing a passive optical resonator.

2. Descripton of the Prior Art

The passive resonator, in addition to the active resonator (laser gyroscope) and the Sagnac interferometer, has long been recognized as suitable for measuring rates of rotation. (G. Sagnac: C. R. Acad. Sci. Paris, 95, 708 (1913)).

S. Ezekiel and S. R. Balsamo investigated the passive ring resonator at the Massachusetts Institute of Technology approximately ten (10) years ago for suitability as rate-of-rotation sensor. U.S. Pat. No. 4,135,822 relates to work performed during this study. The initial experimental results of the study were published in 1977 (Appl. Phys. Lett. 30, 478). Continuous further development of their experimental model led to development of a rate-of-rotation sensor having inertial accuracy under laboratory conditions (Opt. Lett. 6, 569 (1981)).

Although the resonators of the experimental models were executed in mirror technology, the above-referenced United States Patent discloses the possibility of a future fiber resonator. While the state of the art at the time did not allow a successful embodiment to be fabricated in optical fiber, a resonator recently has been built with the aid of a commercial high-quality coupler. This resonator was used to carry out successful measurements (R. E. Meyer et al.: Passive Fiberoptic Ring Resonator for Rotation Sensing, Preprint MIT 1983).

Parallel research work in the United States, particularly in the E. L. Ginzton Laboratory of Stanford University led to the development of a low-loss directional fiber coupler (Electron. Lett. 16, 260 (1980)). Using couplers of this type, it was possible to produce resonators having a finesse of 60-90 (see L. F. Stokes et al.: Opt. Lett. 7, 288 (1982)). Experimental investigations relating to their suitability as rate-of-rotation sensors have been recently published (see G. L. Report No. 33620, E. L. Ginzton Laboratory, Stanford University, September 1983).

The development of integrated passive resonators has also become known (see U.S. Pat. No. 4,326,803 and A. Lawrence, "The Micro-Optic Gyro", NORTHROP Precision Products Division, August 1983).

The unsuitability of mirror technology for the resonator of a rate-of-rotation sensor arises from the fact that it is difficult to maintain the axial $TEM_{oo}$ mode in the resonator under unfavorable environmental conditions. In contrast, lower sensitivity to temperature gradient exists in a fiber resonator in comparison with a Sagnac interferometer because of the considerably shorter fiber length required (see D. M. Shupe: Appl. Opt. 20, 286 (1981)). It is known, however, that such a ring can carry two natural states of polarisation (see B. Lamouroux et al.: Opt. Lett. 7, 391 (1982)). Coupling of these two states can result from environmental influences to produce additional noise in the output channel.

Additionally, only single-mode He-Ne lasers have been used in the past light sources. The backscatter occurring in the fiber resonator in such an arrangement is a significant cause of the interferences that disturb the useful signal. In theory, using one or more longer-wave coherent light sources may lessen the effect of such interference since the Rayleigh backscatter is inversely proportional to the fourth power of the light wavelength. Attempts to use longer-wave-semiconductor lasers have been unsuccessful as laser spectral width is too great for a good fiber resonator. A significant reduction of the spectral width of a semiconductor laser can be achieved by using an external resonator (S. Saito and Y. Yamamoto: Electr. Lett. 17, 325 (1981); M. W. Fleming and A. Mooradian: IEEE J. Quant. Electr. QE-17, 44 (1981)). By adding one or more dispersive elements, gratings and/or mirrors to the semiconductor laser or by directly coating the semiconductor laser, a light source can be obtained such that the quality of the optical resonator is enhanced. The possibility of constructing the external resonator in fiber technology also exists (IEEE Transactions on Microwave Theory and Techniques, MTT-30, No. 10, 1700 (1982)).

The problem of undesired low-frequency interferences in the useful signal due to a signal wave being mixed with the backscattered component of the returning wave always occurs whenever the two opposing light sources occupy the same longitudinal resonator mode. A known possibility of remedying this situation is the use of additional phase modulation in the optical path feeding the resonator (Sanders et al.: Opt. Lett. 6, 569 (1981)).

The occupation of two different longitudinal modes by oppositely-directed light waves brings the interference frequencies into such a high range that they no longer appear as interference. However, this leads to an extraordinarily high temperature-dependent null drift as a change in temperature changes the optical length, and thus the mode separation, of the resonator.

The mode separation $\Delta \nu$ of a ring resonator having a length of L=10 m and an effective refractive index of n=1.46 is:

$$\Delta \nu = \frac{c}{n \cdot L} \cong 20.5 \text{ MHz} \qquad (1)$$

If the fiber of the ring resonator consists of quartz, the change in optical wavelength with a change in temperature is essentially determined by the relative change of the refractive index of about $1 \times 10^{-5}/°C$. This results in a temperature-dependent drift of the mode separation of $$\frac{d \Delta \nu}{dT} = -\frac{c}{n \cdot L} \times \frac{1}{n} \times \frac{dn}{dT} = 140 \text{ Hz/°C}. \qquad (2)$$

If the rate of rotation is determined from the frequency separation of the two light waves oppositely directed in various longitudinal modes, this temperature-dependent change in frequency separation leads to a drift in the null of the rate of rotation via the familiar Sagnac relationship $$\Omega = \frac{P \cdot \lambda}{4F} \times \Delta \nu s \qquad (3)$$

(P: periphery of the resonator, $\lambda$: light wavelength, F: area within the periphery, $\Delta \nu s$: frequency difference between oppositely directed light waves as a result of the Sagnac effect).

In the preceding example, this relationship produces an unacceptably large null drift of 132°/h/°C. for a circular resonator having a diameter of 18 cm and a wavelength of 0.83 μm.

SUMMARY OF THE INVENTION

The foregoing and additional shortcomings of the prior art are addressed and overcome by the present invention that provides, in a first aspect, a method for reading out angular rates employing a passive optical ring resonator. The method includes the step of providing a beam of coherent light whose frequency is at a resonant mode of the ring resonator. This beam is divided into first, second and third component beams, and the first beam is radiated into the resonator in a first direction. Thereafter, the second and third beams are tuned to distinct resonator modes, then radiated into the resonator so that the first beam counter-rotates with the second beam and with the third beam. The frequency differentials of the counterrotating beams are then measured and angular rate calculated as a weighted function of such frequency differentials.

In a second aspect, this invention provides apparatus for reading out angular rates employing a passive optical ring resonator. Such apparatus includes means for generating a beam of coherent light whose frequency is at a first resonant mode of the ring resonator. Means are provided for dividing the beam into first, second and third component beams. A first frequency shifting device is responsive to a first control signal for tuning the second beam to a second distinct resonant mode of the resonator, and a second frequency shifting device is responsive to a second control signal for tuning the third beam to a third distinct resonant mode of the resonator. A coupler is provided for radiating the first beam into the ring resonator in a first direction and for radiating the second and third beams into the resonator in a second direction, whereby the first beam counterrotates with the second and third beams, and for radiating the beams out of the resonator.

A first photodetector is arranged to detect the first component beam after it is radiated out of the resonator and to form a responsive output electrical signal while a second photodetetor is arranged to detect the second and third component beams after they are radiated out of the resonator and to form responsive output electrical signals. A control circuit, responsive to said output electrical signals for forming first and second control signals, is provided. An evaluation circuit, responsive to the first and second control signals, is provided for determining angular rate as the weighted difference of the differential frequencies of the counterrotating beams.

The preceding and additional features and advantages of the invention will become further apparent from the detailed description that follows. This description is illustrated with the aid of a set of drawing figures. Like numerals of the written description and drawings refer to like features of this invention throughout.

BRIEF DESCRIPTION OF THE DRAWINGS

FIG. 2 is a graphical representation of intensity-versus-frequency that characterizes the resonant modes of a ring resonator;

FIG. 3 is a schematic diagram of an angular rate sensor in accordance with a second embodiment of the invention; and FIG. 4 is a detailed schematic diagram of an actually-implemented embodiment of the present invention including modified frequency retuning.

DETAILED DESCRIPTION

Figure 1:
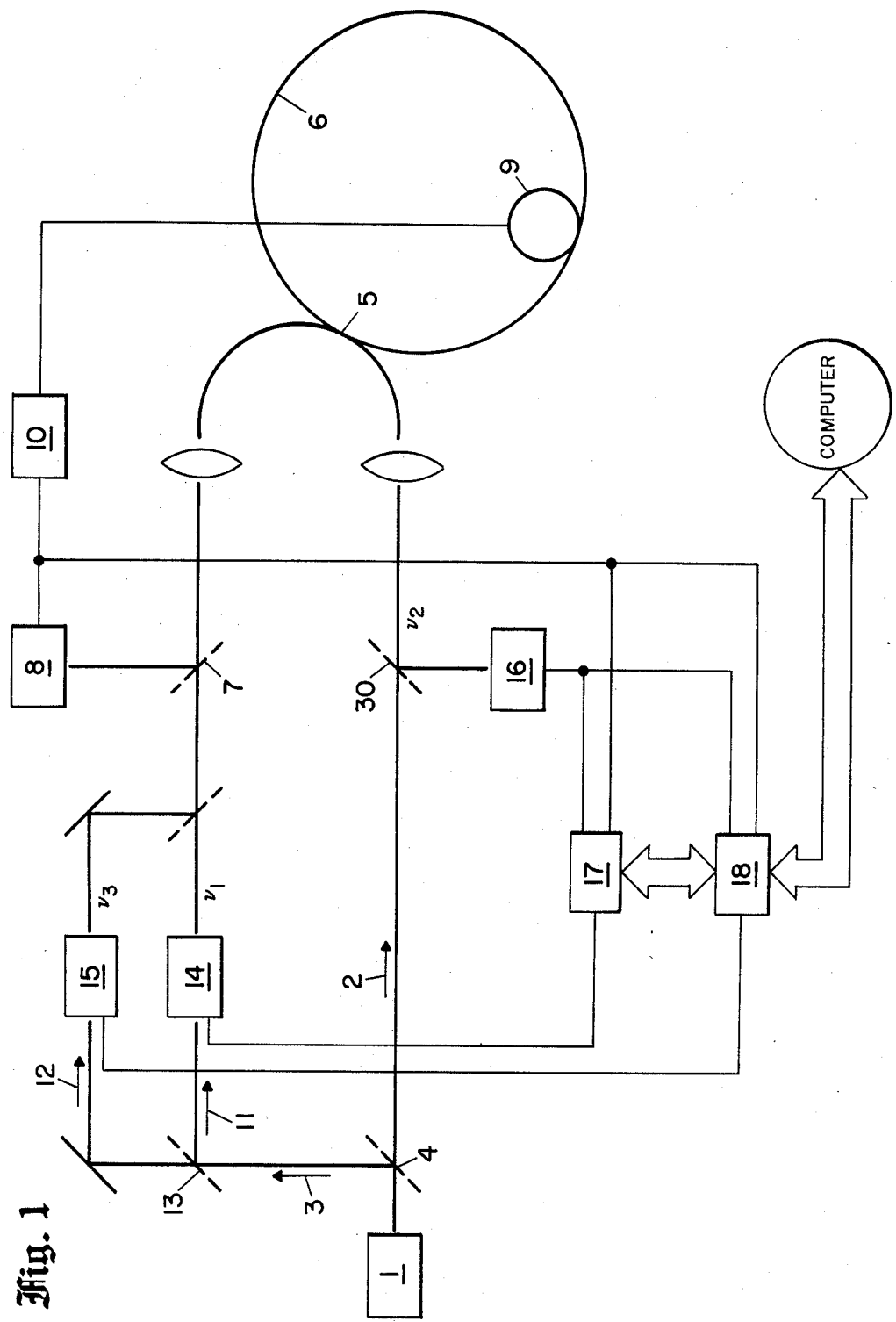
FIG. 1 is an schematic diagram of an angular rate sensor in accordance with a first embodiment of the invention.

Turning now to the drawings, FIG. 1 is a schematic diagram of an angular rate sensor in accordance with the invention. As is shown, light from a laser 1 of sufficiently high coherence is split into component light beams 2 and 3 by means of a beam splitter 4. The component beam 2 is directly radiated into a fiber ring resonator 6 via a directional fiber coupler 5. Light, when coupled out of the resonator 6 by means of the directional coupler 5, is applied to a detector 8 via a beam splitter 7. Frequency tuning can be accomplished by changing the optical length of the resonator 6 (e.g. by means of a piezoelement 9 as in FIG. 1) or by changing the frequency of the light source 1 (e.g. by means of a phase adjustor 9' as in FIG. 4). Continuous tuning is obtained by means of a control loop including the detector 8, control electronics 10, and the piezoelement 9. The control information can be obtained in a phase or frequency modulation process such as that explained with reference to FIG. 4.

The component beam 3 is further divided by means of a beam splitter 13 into component beams 11 and 12. These beams are then radiated into frequency-shifting elements, such as Bragg cells 14 and 15. The Bragg cells shift the frequency of the light in such a manner that the light of the component beam 11 can be tuned to resonator mode $\nu_1$ and the light of component beam 12 to the resonator mode $\nu_3$ (see FIG. 2). The component beams 11 and 12 are alternately radiated in rapid succession, in the opposite direction from the component beam 2, into the ring resonator 6. High frequency alternating switching of the Bragg cells 14 and 15 may be employed for this purpose. A more detailed explanation with regard to the switching frequency employed for the high-frequency Bragg cells is given below.

Light of the frequency-shifted component light beams 11 and 12, coupled out of the resonator 6 through the directional coupler 5, reaches a photodetector 16 via a beam splitter 30. The beams 11 and 12 are then tuned to their respective resonant frequencies by means of the control loop comprising the detector 16 and control electronics 17, 18 by adjusting the high frequency of the Bragg cells 14, 15 in analagous manner to the tuning of the component beam 2.

In order to reduce the influence of such effects as rapid frequency variation of the light source (e.g. laser jitter), acoustical noise in the phase and the like on the control of the frequency of the component beams 11 and 12 when the frequency of variation is above the cut-off frequency for the $\nu_2$ control, a differential method, for example that of Sanders et al. (Opt. Lett. 6, 569 (1981)) may be employed. For higher accuracy, it may be necessary to control the intensity of the component beams 11 and 12. This may be accomplished via the HF power of the Bragg cells 14 and 15, so that compensation according to the invention is efficient and compensates null drifts resulting from the Kerr effect (see Ezekiel et al.: Opt. Lett. 7, 457 (1982)).

The principle of compensation of the invention is as follows. Let the light of the light source 1 be tuned to resonator mode $v_2$ and let the Bragg cells shift the frequencies of the light of beams 11 and 12 so that beam 11 is tuned to resonator mode $v_1$ and beam 12 is tuned to resonator mode $v_3$ as shown in FIG. 2. Upon rotation of the angular rate sensor, the resonant frequency $v_2$ shifts, for example, towards lower frequencies in accordance with the Sagnac effect while the frequencies $v_1$ and $v_3$ increase in accordance with the Sagnac effect.

If the respective shift in resonant frequency due to the Sagnac effect is greater than $\Delta vs/2$, the following applies:

$$v_3 - v_2 = l \cdot \Delta v + \Delta vs \quad (4)$$

$$v_2 - v_1 = k \cdot \Delta v - \Delta vs \quad (5)$$

where k and l are the difference between the ordinal numbers of the longitudinal modes of the frequencies $v_1$, $v_3$ and that of $v_2$.

The difference results in:

$$K \cdot (v_3 - v_2) - l (v_2 - v_1) = (k + l)\Delta vs \quad (6)$$

This supplies a measure of angular rate via relation (3). If, in particular, $k = l = 1$, the following applies:

$$(v_3 - v_2) - (vV_2 - v_1) = 2\Delta vs \quad (7)$$

Forming the difference between the two high frequencies of the Bragg cells 14 and 15 during tuning to the resonator provides exactly twice the Sagnac frequency shift. The temperature-dependent change in optical wavelength finds expression essentially only in the scale factor.

If switching frequency is sufficiently high only negligible temperature changes will occur during one measuring period. If, for example, a rate of temperature change of $10^{-1}°$ C./sec is assumed, the frequency drift for $\Delta v$ is 14 Hz/sec. From this a switching frequency of about 100 Hz is derived.

The sum of the frequencies $$(v_3 - v_2) + (v_2 - v_1) = (k + l) \cdot \Delta v \quad (8)$$

supplies rne mode frequency separation. Thus, a very accurate measure of the temperature of the ring resonator is derived that can be used for compensating the residual temperature errors of the resonator, including the dependence of the scale factor for the angular rate, by changing the optical path of the resonator.

FIG. 3 is a schematic diagram of an angular rate sensor in accordance with an alternative embodiment of the invention. This embodiment features a particularly simple optical configuration in which the Bragg cells 14 and 15 of FIG. 1 are replaced by a single acousto-optical modulator 20. The modulator 20 operates in the Raman-Nath region and utilizes a single controller 17. Switching between the light beams 11 and 12 can be accomplished by, for example, electromagnetically or piezoelectrically controlled shutters 21, 22 or diaphragms. A diaphragm arrangement might be mounted, for example, on a piezoelectric dual-layer element (bimorph switch).

Alternatively, a single modulator might be employed having two opposite acoustic exciters operated correspondingly to the two Bragg cells of FIG. 1. Another possibility would be the use of a single Bragg cell driven by two frequencies that differ so that the associated light beams can be geometrically separated as the difference in the deflection of the two beams is greater than the angular divergence of an individual beam.

With alternating operation of the component beams 11 and 12, a frequency standard is required in the evaluating circuit so that the respective tuning frequency can be measured with sufficient accuracy. This can be avoided if the component beams 11 and 12 that are simultaneously radiated into the ring resonator 6 are phase- or frequency-modulated with different frequencies. In this event separate tuning is made possible by the respective control loops, equipped with appropriate filters. In this event, mixed frequencies of the component beams 11 and 12 should not be located in the vicinity of the frequency of the component beam 2. Low-frequency interferences via the Rayleigh-back scatter are thereby prevented. The angular rate is then calculated in accordance with relation (6) the longidutindal mode allocation being different.

FIG. 4 shows a complete and actually tested arrangement of a device according to the invention. In this figure, the assemblies known from FIG. 1 and explained above are specified with the reference designations used in that figure. Instead of the beam splitters specified only diagrammatically in FIG. 1, directional fiber coupler elements are used in the arrangement of FIG. 4 that are marked by the letter k throughout.

The tuning of the coherent light source (formed by a laser diode 1 followed by an optical isolator 31) to the resonant frequency of the resonator 6 is carried out by changing the frequency of the Fabry-Perot resonator (consisting of a light-conducting fiber) by means of a phase-shifting circuit 9'. A control loop, consisting of photo diodes 32, mixer 47, controller 48 and laser diode supply section 51, and a temperature-stabilizing circuit 52, provides a constant modulation swing of the light source modulated with the oscillator 50. The output frequency of the light source 1 is tuned to the resonator 6 by photo diodes 8 and subsequent control loop comprising elements 45, 46, 49 and 9'. The intensity, thus tuned to a minimum, of the light beam 2 circulating counter-clockwise, is compared at the differential amplifier 17 with the light beams 11, 12 that have been frequency-shifted by acousto-optical modulators 14, 15 and detected with photodiode 16. The demodulated and filtered output signal 33, 34, 35 of the differential amplifier 17 is used, via controller 36, VCO (voltage-controlled oscillator) 38 and amplifier 41 (light beam 12) or controller 37, VCO (voltalge-controlled oscillator) 39 and amplifier 42 (light beam 11), for retuning the frequency of the light beams circulating clockwise; light intensity is readjusted by means of controller 53. The signal generator 40, synchronized by a computer, provides for the alternating coupling-in of the two light beams 11 and 12 into the ring and supplies gating signals to the counters 43 and 44, the output signals of which are read out by the computer.

Thus it is seen that there has been brought to the passive optical resonator art a new method and associated apparatus for reading out angular rates. By employing the teachings of the invention, one is able to realize numerous advantages over the prior art. Included among these is the important prevention of disturbing low-frequency interferences occasioned by such effects as Rayleigh and other backscatter. In addition, the invention directly provides digital output data, ensuring a measurement with a large dynamic range as the upper limitation of angular rates is determined solely by the amount of mode separation or bandwidth of the frequency shifting elements, such as Bragg cells, employed.

By utilizing the teachings of the invention, one is further enabled to compensate the effect of temperature drift on the measurement of angular rates. Additionally, accurate averaged resonator temperature information is made available for temperature modulation of scale factor, null drift and other factors in accordance with the invention.

While this invention has been disclosed with reference to its presently preferred embodiments, its teachings are by no means so limited. For example, the resonator 6 need not be an optical fiber but might also comprise a ring optical cavity within a block having three or four corrner mirrors for directing laser light. Rather, the scope of this invention is defined by the following set of claims and all equivalents thereof.

What is claimed is:

1. A method for reading out angular rates with a passive optical ring resonator said method comprising the steps of:
   (a) providing a beam of coherent light whose frequency is a resonant mode of said ring resonator cavity; then
   (b) dividing said beam into first, second and third component beams; then
   (c) radiating said first beam into said resonator in a first direction; then
   (d) tuning the frequency of said second beam to a lower resonant cavity mode and tuning the frequency of said third beam to a higher resonant cavity mode; then
   (e) alternately radiating said second and third beams into said resonator in a second opposite direction so that said first component beam simultaneously counterrotates with one of said second and third component beams to thereby excite different modes at the same time; then
   (f) measuring a first frequency differential between said first and second counterrotating beams and a second frequency differential between said third and first counterrotating beams; and then
   (j) calculating the angular rate as a weighted function of said first and second frequency differentials.

2. A method as defined in claim 1 further including the step of calculating the optical length of said resonator, temperature and scale factor of the angular rate measurement as the sum of said weighted frequency differentials.

3. Apparatus for reading out angular rates with a passive optical ring resonator, said apparatus comprising, in combination:
   (a) means for generating a beam of coherent light whose frequency is a first resonant mode of said ring resonator;
   (b) means for dividing said beam into first, second and third component beams;
   (c) a first frequency shifting device responsive to a first control signal for tuning the frequency of said second beam to a lower distinct resonant mode of said resonator;
   (d) a second frequency shifting device responsive to a second control signal for tuning the frequency of said third beam to a higher distinct resonant mode of said resonator;
   (e) a coupler for radiating said first beam into said ring resonator whereby said first beam alternately counterrotates simultaneously with said second and third beams;
   (f) a first photodetector arranged to detect said first component beam after it is radiated out of said resonator and to form an output electrical signal responsive thereto;
   (g) a second photodetector arranged to detect said second and third component beams after they are radiated out of said resonator and to form output electrical signals responsive thereto;
   (h) a control circuit responsive to said output signals for forming said first and second control signals; and
   (i) an evaluation circuit responsive to said first and second control signals, said evaluation circuit being arranged to determine angular rate as the weighted difference of the frequency differentials between said first and second counterrotating beams and between said third and first counterrotating beams.

4. Apparatus as defined in claim 3 further characterized in that said ring resonator comprises a fiber ring of strongly birefringent, polarization-maintaining monomode fiber.

5. Apparatus as defined in claim 3 further characterized in that said ring resonator comprises a fiber ring of strongly polarizing light conducting fiber.

6. Apparatus as defined in claim 3 further characterized in that said ring resonator includes a polarizer.

7. Apparatus as defined in claim 3 wherein said ring resonator comprises a resonant cavity.

8. Apparatus as defined in claim 7 wherein said resonator further includes three mirrors.

9. Apparatus as defined in claim 7 wherein said resonator further includes four mirrors.

10. Apparatus as defined in claim 3 wherein said ring resonator, coupler and frequency shifting devices are fabricated in integrated optics.

11. Apparatus as defined in claim 3 wherein said first and second frequency shifting devices comprise Bragg cells.

12. Apparatus as defined in claim 3 wherein said first and second frequency shifting devices comprise an acousto-optical modulator including two acoustical exciters.

13. Apparatus as defined in claim 3 wherein said first and second frequency shifting devices comprise a Bragg cell having a plurality of frequency-drive arrangements associated therewith.

14. Apparatus as defined in claim 3 wherein said means for dividing and said frequency shifting devices consist of an acousto-optical modulator operating in the Raman-Nath region.

15. Apparatus as defined in claim 3 further including means engaged to said first and second frequency shifting devices for alternately radiating said second and third beam into said ring resonator at a preselected frequency.

16. Apparatus as defined in claim 15 wherein said last-named means comprises a pair of diaphragms.

17. Apparatus as defined in claim 16 wherein said diaphragms are electromagnetically controlled.

18. Apparatus as defined in claim 17 wherein said diaphragms are piezoelectrically controlled.

19. Apparatus as defined in claim 3 including means for modulating said second and third beams so that said beams can be separated by appropriate filtering of said output electrical signals.

* * * * *